United States Patent [19]

Kalfs et al.

[11] Patent Number: 5,488,516

[45] Date of Patent: Jan. 30, 1996

[54] APPARATUS FOR REPRODUCING N DIGITAL SIGNALS FROM N ADJACENT TRACKS ON A RECORD CARRIER

[75] Inventors: Johannes J. W. Kalfs; Franciscus A. Kneepkens, both of Eindhoven, Netherlands

[73] Assignee: U.S. Philips Corporation, New York, N.Y.

[21] Appl. No.: 214,913

[22] Filed: Mar. 17, 1994

[30] Foreign Application Priority Data

May 7, 1993 [EP] European Pat. Off. .............. 93201327

[51] Int. Cl.[6] .............................. G11B 5/09; G11B 15/12
[52] U.S. Cl. .................................... 360/51; 360/63
[58] Field of Search .................... 360/51, 63, 32, 360/46, 73.01, 73.04, 73.09, 73.12

[56] References Cited

U.S. PATENT DOCUMENTS

| | | | |
|---|---|---|---|
| 3,820,156 | 6/1974 | Schulz | 358/10 |
| 4,433,424 | 2/1984 | Taber et al. | 375/106 |
| 4,470,082 | 9/1984 | VanPelt et al. | 360/51 |
| 5,206,769 | 4/1993 | Bailey et al. | 360/51 |
| 5,313,346 | 5/1994 | Shimotushiro et al. | 360/51 |

Primary Examiner—Aristotelis Psitos
Assistant Examiner—W. Chris Kim
Attorney, Agent, or Firm—Richard A. Weiss

[57] ABSTRACT

For the clock extraction from n digital signals read from each of n tracks there are provided n phase-locked loops. In order to compensate for speed variations in the speed of transport of the record carrier there is provided an additional frequency control system. This system derives a control signal which is a measure of the speed variations, which control signal is applied to the voltage-controlled oscillators of all the phase-locked loops as a common control signal.

6 Claims, 1 Drawing Sheet

APPARATUS FOR REPRODUCING N DIGITAL SIGNALS FROM N ADJACENT TRACKS ON A RECORD CARRIER

BACKGROUND OF THE INVENTION

The invention relates to an apparatus for reproducing n digital signals from n adjacent tracks on a record carrier. Such an apparatus comprises (a) a read unit having n read heads, each having an output, for reading n information signals from the n tracks and supplying the n information signals to the outputs of the n read heads;

(b) n detection units having inputs coupled to the outputs of the n read heads, for deriving n digital signals from the n information signals read from the n tracks and supplying the n digital signals to output of the n detection units; and (c) n phase-locked loops having inputs coupled to the outputs of the n read heads, each phase-locked loop including a phase comparator having a first input coupled to one of the inputs of the phase-locked loop, a second input and an output; a voltage-controlled oscillator having an input coupled to the output of the phase comparator and an output for supplying a clock signal of a given frequency, which output is coupled to the second input of the phase comparator.

The above-described apparatus is known, for example, in the form of a magnetic-tape recorder of the SDAT type or the DCC type. Such a recorder is capable of reading magnetic tapes on which digital audio has been recorded in a plurality of longitudinal tracks. This enables music reproduction of substantially CD quality to be achieved.

A magnetic-tape recorder of the DCC type has come onto the market recently and is intended to be the new digital cassette recorder standard to supersede the current Compact Cassette standard. For the consumer market, it has also been envisaged that such a recorder will be available for portable use and for use in car radios. This imposes additional requirements on the immunity of such a recorder to mechanical vibrations and shocks, in order to guarantee audio reproduction of substantially CD quality.

SUMMARY OF THE INVENTION

It is an object of the invention to provide an apparatus of the above-described type having an improved immunity to vibrations and shocks. Such an apparatus is characterized in that it comprises a control signal generator for deriving from the (n) output signals of the phase comparators a control signal which is a measure of the deviation of the relative speed of transport of the record carrier with respect to the read unit from the nominal relative speed of transport of the record carrier with respect to the read unit, and for supplying the control signal to an output; and units for applying the control signal to the inputs of the n voltage-controlled oscillators.

The invention is based on the recognition of the following fact. For clock extraction during readout of an information signal from a track on a record carrier, a phase-locked loop is used. Mechanical vibrations and shocks result in variations of the relative speed of a read head with respect to the track. A phase-locked loop should have a bandwidth narrow enough to be immune to the noise present in an input signal applied to the phase-locked loop and, conversely, the bandwidth should be so large that the phase-locked loop is still capable of following the speed variations of the tape. In practice, an optimum bandwidth for a phase-locked loop is determined for which the phase-locked loop operates correctly. Nevertheless, it has been found that the phase-locked loop frequently comes out of lock in the case of shocks. A more limited bandwidth of the phase-locked loop again means that it is more difficult to track the normal speed variations of a tape. In order to extend the lock-in range of a phase-locked loop, it is known per se to add a frequency control loop.

In accordance with the present invention, the output signal of the phase comparator for each of the n tracks is applied to a common frequency control loop. Further, it is assumed that the speed variations are the same for all the tracks. Averaging the summed n phase errors yields a control signal which is a measure of the variation of the relative speed of transport of the record carrier with respect to the read unit. The control signal, which may be regarded as a frequency control signal, is subsequently applied to the voltage-controlled oscillators of all of the phase-locked loops. Since the information from all of the n tracks is used, it is possible to derive a control signal whereby the phase-locked loop responds more rapidly to speed variations. The frequency control proposed here differs from the above-mentioned frequency controls known from the literature in that it is a common frequency control.

For deriving the control signal, the apparatus in accordance with the invention may be characterized further in that the control signal generator comprises a signal combination unit having n inputs for receiving the (n) output signals of the n phase comparators, and having an output coupled to the output of the control signal generator via an integrating element.

In still a further embodiment, the apparatus in accordance with the invention may be characterized in that the control signal generator further comprises a detection unit having an input coupled to the output of the integrating element and having an output coupled to a control signal input of a controllable amplifier device, which controllable amplifier device is coupled between the output of the signal combination unit and the input of the integrating element. By comparing in the detector the output signal of the detector with a threshold value and, when this threshold value is exceeded, applying to the controllable amplifier device a control signal to increase the gain the bandwidth of the frequency control loop is extended and a faster control is achieved.

BRIEF DESCRIPTION OF THE DRAWINGS

The invention will now be described in more detail, by way of example, with reference to the figures in which.

DESCRIPTION OF THE PREFERRED EMBODIMENTS

Figure 1:
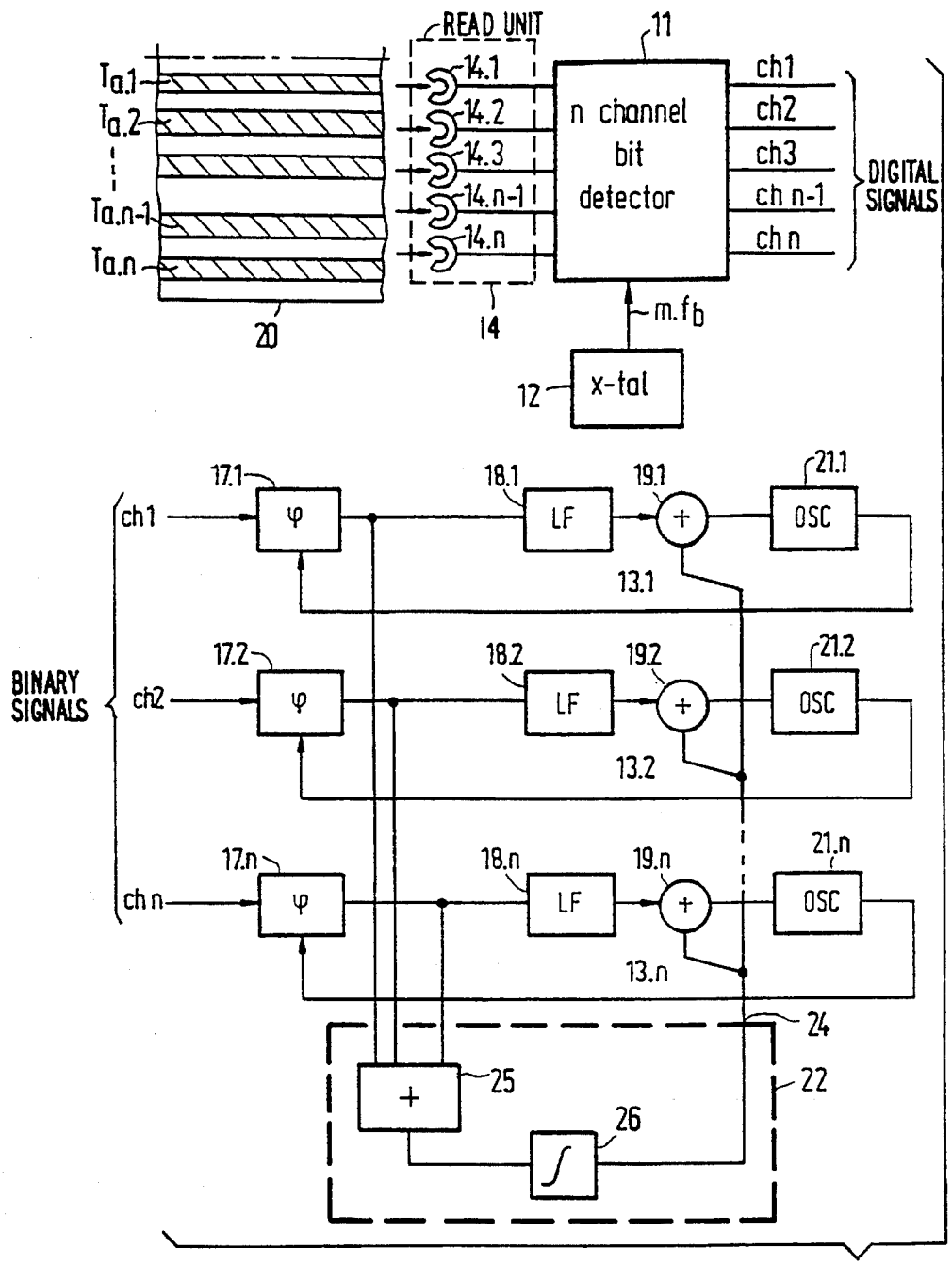
FIG. 1 shows an embodiment of an apparatus in accordance with the invention.

FIG. 1 shows an apparatus intended for reading a digital signal from each of n tracks $T_{a,1}$ to $T_{a,n}$ of a record carrier 20 in the form of a tape, which tracks extend adjacent to one another in the longitudinal direction of the record carrier 20. Only one half of the record carrier 20 is shown. The apparatus has a read unit 14 comprising n read heads 14.1 to 14.n which each derives an analog signal from a corresponding one of the n tracks. The n analog signals are applied to an n-channel bit detector 11 which ultimately produces n digital signals, one for each of the channels ch 1 to ch n. However, beforehand the n analog signals are sampled and converted into n binary signals under the influence of a clock signal of a clock frequency $m.f_b$ applied to the bit detector 11 by a fixed oscillator 12.

The clock frequency to be used for bit detection is derived from each of the n binary digital signals. To achieve this, the resulting n binary signals are each applied to a phase-locked loop, n such phase-locked loops 13.1 to 13.n being provided. For each channel ch i of the channels ch 1 to ch n, a corresponding binary signal is applied to a first input of a phase comparator 17.i. The output of the phase comparator 17.i is coupled to the control signal input of a voltage-controlled oscillator 21.i, if required via a loop filter 18.i. The oscillator 21.i may be constructed as a discrete time oscillator. The output of the oscillator 21.i is coupled to a second input of the phase comparator 17.i.

In accordance with the invention, the apparatus of FIG. 1 also comprises a control signal generator 22. The control signal generator 22 is adapted to derive from the n output signals of the phase comparators 17.1 to 17.n, and to supply to an output 24 thereof a control signal which is a measure of the deviation of the relative transport speed of the record carrier 20 with respect to the read unit 14 from the nominal relative transport speed of the record carrier 20 with respect to the read unit 14.

The apparatus of FIG. 1 further comprises units for applying the control signal to the inputs of the n voltage-controlled oscillators 21.1 to 21.n. In the preferred embodiment, those units are signal combination units 19.1 to 19.n (as shown in FIG. 1). The signal combination units 19.1 to 19.n may each be constructed as an adder and have a first input coupled to the output 24 of the control signal generator 22, a second input coupled to the output of a loop filter 18.i, and an output coupled to the control signal input of the oscillator 21.i.

The control signal generator 22 comprises a signal combination unit 25 and an integrating element 26. The signal combination unit 25 has n inputs which are each coupled to one of the outputs of the phase comparators 17.1 to 17.n. The output of the signal combination unit 25 is coupled to the input of the integrating element 26, which has an output coupled to the output 24 of the control signal generator 22.

Figure 2:
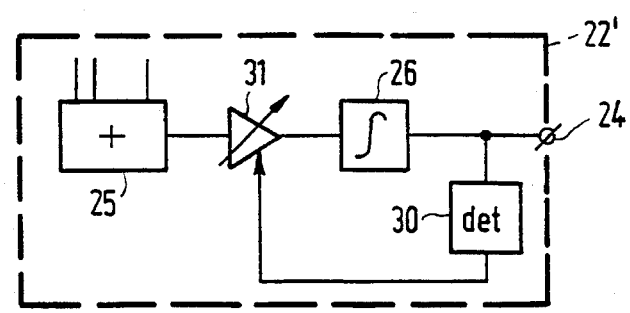
FIG. 2 shows a modification of a control signal generator used in the embodiment shown in FIG. 1.

FIG. 2 shows a modified control signal generator 22', which can be used in place of control signal generator 22. The control signal generator 22' comprises the elements of the control signal generator 22, but in addition, comprises a detector 30 and a controllable amplifier 31. The controllable amplifier 31 is coupled between the output of the signal combination unit 25 and the input of the integrating element 26. The detector 30 has an input coupled to the output of the integrating element 26 and an output coupled to a control signal input of the controllable amplifier 31 which controls the gain factor of the amplifier 31 under the influence of the control signal. The detector 30 is adapted to detect whether the output signal of the integrating element 26 exceeds a given threshold value. If that value is exceeded, this means that there is a certain frequency deviation which is to be eliminated more rapidly. This is achieved by additionally amplifying the output signal of the signal combination unit 25 so that a frequency control signal of a larger amplitude can be applied to the voltage-controlled oscillators 21.1 to 21.n.

The invention has the advantage that the bandwidth of the phase-locked loops 13.1 to 13.n can be comparatively small because speed variations of the record carrier 20 are handled by the additional control system (which may be regarded as a frequency control system). Moreover, since the control signal generator 22 uses n times as many signal transitions to determine the control signal, the signal-to-noise ratio of the control signal is higher.

The detector 30 preferably has a hysteresis in the threshold value such that, after the threshold value has been exceeded and the gain factor of the amplifier 31 has been increased, the threshold value is set to a lower level. This prevents the output signal of the integrating element 26 from oscillating, which would lead to an oscillation of the gain factor of the amplifier 31, i.e., the gain factor each time varying from a high to a low value.

The detector 30 also preferably has a delay such that, if the output signal of the integrating element 26 decreases below the threshold value, the gain factor of the amplifier 31 is reduced with a delay. Changing over to a higher value upon detection that the output signal of the integrating element 26 exceeds the threshold value is effected more or less instantaneously.

Various implementations of the apparatus described herein are possible. In this respect, it is to be noted that not all of the elements as indicated in the embodiments (i.e., circuits) shown in FIG. 1 or 2 need to be provided n times (or 2n times). The functions which can be time-multiplexed for the n channels in principle require only one element, which then operates in time-multiplex.

It is to be noted also that the control signal supplied to the output 24 of the control signal detector 22 can be used as a control signal for the direct control of the tape-transport speed control system. This enables a rapidly operating transport-speed control to be realized.

We claim:

1. An apparatus for reproducing n digital signals from n adjacent tracks included on a record carrier, the apparatus comprising:

read means for reading n information signals from the n tracks;

detection means for deriving the n digital signals from n binary signals derived from the n information signals;

n phase-locked loops which each receives a respective one of the n binary signals, each phase-locked loop including (a) a phase comparator having a first input for receiving one of the n binary signals, a second input and an output for supplying a comparison signal; and (b) a voltage-controlled oscillator having an input coupled to the output of the phase comparator, and an output for supplying a clock signal of a given frequency, which output is coupled to the second input of the phase comparator;

control signal generator means for deriving from the comparison signals supplied by the phase comparators of the n phase-locked loops a control signal which is a measure of the deviation of the relative speed of transport of the record carrier with respect to the read means from the nominal relative speed of transport of the record carrier with respect to the read means, the control signal generator means having (a) n inputs which are each coupled to the output of a respective one of the phase comparators of the n phase-locked loops for receiving the comparison signals supplied by the phase comparators of the n phase locked loops, and (b) a separate output for supplying the control signal; and combination means for (a) combining the control signal with each of the comparison signals supplied by the phase comparators of the n phase locked-loops separately to produce a respective combination signal for each of the n phase-locked loops, and (b) supplying each respective combination signal to the input of the voltage controlled oscillator of the phase-locked loop for which that respective combination signal is produced, the combination means coupling the output of the phase comparator and the input of the voltage controlled oscillator of each phase locked-loop of the n phase-locked loops together and with the output of the signal control generator means.

2. The apparatus as claimed in claim 1, wherein the control signal generator means includes (a) a combination unit having inputs coupled to the outputs of the phase comparators of the n phase-locked loops, and an output; and (b) an integrating element having an input coupled to the output of the signal combination unit, and an output coupled to the combination means.

3. The apparatus as claimed in claim 2, wherein the control signal generator means further includes (a) a controllable amplifier coupled between the output of the combination unit and the input of the integrating element, and having a control signal input; and (b) a detector having an input coupled to the output of the integrating element, and an output coupled to the control signal input of the controllable amplifier.

4. The apparatus as claimed in claim 1, wherein the read means comprises n read heads for reading the n information signals from the n tracks.

5. The apparatus as claimed in claim 1, wherein the combination means includes n combination units, each of which (a) is associated with a respective one of the n phase-locked loops and (b) has (i) a first input coupled to the output of the phase comparator of the phase-locked loop with which that combination unit is associated, (b) a second input coupled to the output of the control signal generating means and (c) an output coupled to the input of the voltage controlled oscillator of the phase-locked loop with which that combination unit is associated.

6. An apparatus for reproducing n digital signals from n adjacent tracks included on a record carrier, the apparatus comprising:

read means for reading n information signals from the n tracks;

detection means for deriving the n digital signals from n binary signals derived from the n information signals;

n phase-locked loops which each receives a respective one of the n binary signals, each phase-locked loop including (a) a phase comparator having a first input for receiving one of the n binary signals, a second input and an output for supplying a comparison signal; and (b) a voltage-controlled oscillator having an input coupled to the output of the phase comparator, and an output for supplying a clock signal of a given frequency, which output is coupled to the second input of the phase comparator;

control signal generator means for deriving from the comparison signals supplied by the phase comparators of the n phase-locked loops a control signal which is a measure of the deviation of the relative speed of transport of the record carrier with respect to the read means from the nominal relative speed of transport of the record carrier with respect to the read means; and application means for causing the control signal to be applied to each of the voltage-controlled oscillators of the n phase-locked loops;

wherein the control signal generator means includes (a) a combination unit having inputs coupled to the outputs of the phase comparators of the n phase-locked loops, and an output; (b) a controllable amplifier having a first input coupled to the output of the signal combination unit, a second input and an output; (c) an integrating element having an input coupled to the output of the controllable amplifier and an output coupled to the application means; and (d) a detector having an input coupled to the output of the integrating element, and an output coupled to the second input of the controllable amplifier.

* * * * *